G. B. ROE.
Hand Seeder.
No. 37,922. Patented Mar. 17, 1863.
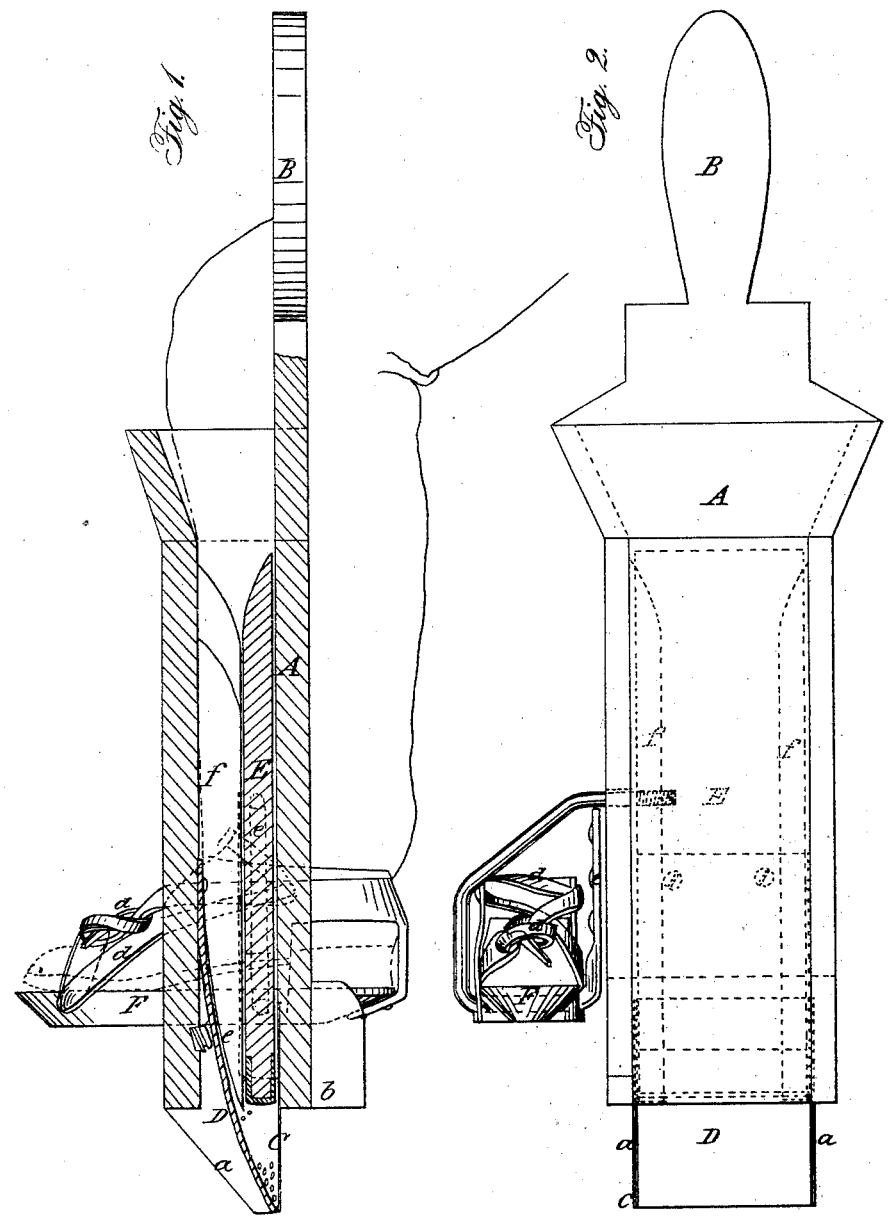
Witnesses:
Inventor:

UNITED STATES PATENT OFFICE.

GILES BOLIVAR ROE, OF PAINE'S POINT, ILLINOIS.

IMPROVED FOOT CORN-PLANTER.

Specification forming part of Letters Patent No. 37,922, dated March 17, 1863.

*To all whom it may concern:*

Be it known that I, G. B. ROE, of Paine's Point, in the county of Ogle and State of Illinois, have invented a new and Improved Foot Corn-Planter; and I do hereby declare that the following is a full, clear, and exact description of the same, reference being had to the accompanying drawings, forming a part of this specification, in which—

Figure 1 represents a transverse vertical section of my invention. Fig. 2 is a rear elevation of the same.

Similar letters of reference in both views indicate corresponding parts.

To enable those skilled in the art to make and use my invention, I will proceed to describe its construction and operation with reference to the drawings.

The seed-box A consists of a tube about three feet six inches long, with a rectangular cross-section of four inches by two and a half, more or less, and it is provided with a handle, B, for the left hand of the operator when planting. A spade, C, with lips $a$, is rigidly attached to the lower end of the seed-box A, and this spade is made of sheet-steel and provided with a sharp cutting-edge, so that it enters the ground readily. This spade projects beyond the lower edge of the box A, and a shoulder, $b$, which rises from the side of said box, gages the depth of planting.

A curved plate, D, which is secured to the inner side of the box A, opposite the spade C, and the lower end of which bears against the inner side of the spade near to its bottom edge, prevents the seed from falling out at the bottom end of the box A. A spiral spring, $c$, keeps the plate D up against the inner side of the spade, and a plunger, E, when depressed, forces said plate open and discharges a portion of the seed from the interior of the box.

The plunger E is raised and depressed by the action of the operator's left foot, which is secured by means of suitable straps, $d$, to the foot-board F. This foot-board is attached to a stirrup, $e$, which is firmly secured to the edge of the plunger, and one arm of which passes through the foot-board, so that the latter is free to oscillate, and thus it will accommodate itself to the position assumed by the operator's foot in walking along with the machine. So far as I am aware, no planter with an oscillating foot-rest has ever before been made. Strips $f$, of wood or other suitable material, which are rigidly secured to the sides of the box, form the guides for the plunger.

To plant with this planter the operator takes a planting-bag with seed, as when planting in the ordinary way, makes his left foot fast on the foot-rest, with his left hand clasps the handle B, with the right hand takes seed from the planting-bag and deposits it in the tube A just below B, one hill at a time, and as the plunger is raised the seed falls to the lowest space between the plate D and the plunger E, and by making one step with the left foot a hill is planted, and in like manner the next. Thus it will be seen that this planter is operated entirely by the action of the foot, and it is obvious that the same can be used with advantage for planting Indian corn, cotton, peas, pumpkins, or any other similar seed. It is very simple in its construction, and all its parts are so constructed that the same are not liable to get out of order.

Having thus fully described my invention, what I claim as new, and desire to secure by Letters Patent, is—

The combination of the oscillating foot-board F with the box A, plunger E, spade C, and plate D, all in the manner herein shown and described.

GILES BOLIVAR ROE.

Witnesses:
 MASON TAYLOR,
 JANE S. TAYLOR.